(12) United States Patent
Niederer et al.

(10) Patent No.: US 7,770,716 B2
(45) Date of Patent: Aug. 10, 2010

(54) CENTRIFUGAL EJECTOR

(76) Inventors: Hermann Jun Niederer, Hofstadtgegend 27, Frankenfels (AT) A-3213; Manuel Niederer, Hofstadtgegend 27, Frankenfels (AT) A-3213; Alexander Niederer, Hofstadtgegend 27, Frankenfels (AT) A-3213

( * ) Notice: Subject to any disclaimer, the term of this patent is extended or adjusted under 35 U.S.C. 154(b) by 0 days.

(21) Appl. No.: 12/296,950

(22) PCT Filed: Apr. 11, 2007

(86) PCT No.: PCT/AT2007/000159

§ 371 (c)(1),
(2), (4) Date: Oct. 13, 2008

(87) PCT Pub. No.: WO2007/115345

PCT Pub. Date: Oct. 18, 2007

(65) Prior Publication Data

US 2009/0173600 A1    Jul. 9, 2009

(30) Foreign Application Priority Data

Apr. 11, 2006 (AT) .............. GM 291/2006

(51) Int. Cl.
*B65G 31/04* (2006.01)

(52) U.S. Cl. ........................... 198/642; 37/242

(58) Field of Classification Search ............ 198/641, 198/642; 37/242, 251, 259
See application file for complete search history.

(56) References Cited

U.S. PATENT DOCUMENTS

| 2,626,571 | A | * | 1/1953 | Hoeneeke | 198/642 |
| 3,369,647 | A | * | 2/1968 | Van der Lely | 198/642 |
| 3,592,393 | A | * | 7/1971 | Sinden | 198/642 |
| 3,592,394 | A | * | 7/1971 | Sinden | 198/642 |

FOREIGN PATENT DOCUMENTS

| CH | 222749 A | 8/1942 |
| CH | 249075 A | 6/1947 |
| CH | 559288 A5 | 2/1975 |
| FR | 1099252 A | 9/1955 |

OTHER PUBLICATIONS

International Search Report for PCT/AT2007/000159.

* cited by examiner

*Primary Examiner*—James R Bidwell
(74) *Attorney, Agent, or Firm*—Brooks Kushman P.C.

(57) ABSTRACT

In the case of a centrifugal ejector with a centrifugal wheel which has at least one ejection lever, is mounted in a housing having an ejection opening and can be driven such that it rotates, the at least one ejection lever is fixed pivotably on the centrifugal wheel, and a mechanism is provided for changing of the pivoting angle of the ejection lever as a function of the angle of rotation of the centrifugal wheel.

8 Claims, 3 Drawing Sheets

CENTRIFUGAL EJECTOR

BACKGROUND OF THE INVENTION

1. Field of the Invention

The application relates to a centrifugal ejector with a centrifugal wheel which has at least one ejector lever and which is mounted in a housing having an ejection orifice and can be driven in rotation.

2. Background Art

Centrifugal ejectors of this type are used in many different fields of use. Particularly in the agricultural and forestry sector, it is known to use centrifugal ejectors of this type in harvesting machines, decorticating appliances and the like. In addition to independent devices of this type, accessory devices are also known, which can be coupled to tractors and other agricultural machines, so that they are driven by the engine of these. In this context, for example, rotary snow plows, which are coupled to tractors or small excavators, have become known.

Rotary snow plows, as a rule, have a cutting drum which is mounted in front of the vehicle and the axis of which runs parallel to the vehicle axis. On the drum, which extends mostly over the entire vehicle width, lamellae are mounted in the form of a worm, which serve both for scraping off the snow, for which purpose the lamellae may also be provided with a sawtooth profile, and for transport to a snow ejector device. If the snow ejector is mounted in the middle of the cutting drum, the screw of the lamellae is designed in two parts with opposite chirality. Transport in the horizontal direction functions in the same way as in an Archimedean screw, so that the snow cut away over the entire width of the drum is transported to the middle. The snow thrower is arranged there and ejects the snow conveyed to the middle. The snow ejector may in this case be formed by a centrifugal ejector which, as initially mentioned, has a centrifugal wheel with at least one ejector lever. In this case, of course, the ejection rate is dependent on the circumferential speed of the centrifugal wheel or of the individual ejector levers but also, in particular, on the applied torque.

SUMMARY OF THE INVENTION

The aim of the present invention, therefore, is to provide a centrifugal ejector having an increased ejection capacity under identical drive conditions.

To achieve this object, the centrifugal ejector of the type initially mentioned is characterized essentially in that the at least one ejector lever is secured pivotably to the centrifugal wheel and means for the defined variation of the pivot angle of the ejector lever as a function of the angle of rotation of the centrifugal wheel are provided, the means being designed to bring about, over a first range of angle of rotation, a pivoting of the ejector lever in the direction of rotation and, over a further range of angle of rotation, a pivoting of the ejector lever opposite to the direction of rotation of the centrifugal wheel, and the ejection orifice being connected tangentially to the centrifugal wheel within, preferably toward or at the end of, the first range of angle of rotation. Since the ejector lever is secured pivotably to the centrifugal wheel, during a corresponding pivoting of the ejector lever the circumferential speed of the ejector lever can be increased, while the rotational speed of the centrifugal wheel remains the same, so that the ejection capacity is improved. For this purpose, according to the invention, there is provision for means to be provided for the defined variation of the pivot angle of the ejector lever as a function of the angle of rotation of the centrifugal wheel, the means being designed to bring about, over a first range of angle of rotation, a pivoting of the ejector lever in the direction of rotation and, over a further range of angle of rotation, a pivoting of the ejector lever opposite to the direction of rotation of the centrifugal wheel. In such a control of the pivoting movement of the individual ejector levers, an increasing circumferential speed of the ejector levers is achieved over the first range of angle of rotation, and, when the further range of angle of rotation is being covered, in turn, a decreasing circumferential speed of the ejector levers is achieved.

In this case, there is provision for the ejection orifice to be connected tangentially to the centrifugal wheel within, preferably toward or at the end of, the first range of angle of rotation, that is to say at a point at which the circumferential speed of the respective ejector lever increases or is the highest, so that the material to be ejected is ejected at a correspondingly higher speed.

Overall, owing to the design according to the invention, the selected rotational speed of the centrifugal wheel can be lower than in conventional designs, since the circumferential speed of the ejector levers is not obtained from the rotational speed of the centrifugal wheel alone, but can be increased to the required amount by means of the above-described additional pivoting of the ejector levers. Thus, for example, when the centrifugal ejector is coupled to a tractor power take-off shaft rotating at a rotational speed of 2200 revolutions per minute, up to four-fold reduction is possible, that is to say to a rotational speed of 540 revolutions per minute. As a result of this, then, a quadrupling of the torque is achieved, so that the ejection capacity of the centrifugal ejector can be increased correspondingly. Owing to the higher torque, it is possible, for example, to arrange a smaller number of ejector levers on the centrifugal wheel, so that, overall, a higher degree of filling is achieved and larger quantities of material per unit time can be ejected.

In order to put the ejection forces into effect particularly efficiently in this case, there is preferably provision for the ejector lever to be arranged, preferably to be of angled design, so that the outwardly extending lever arm forms an angle of essentially 90° with the axis of the ejection orifice in a radial position with respect to the centrifugal wheel.

According to one preferred embodiment, a particularly simple control of the ejector lever pivoting is obtained in that the at least one ejector lever is designed as a two-armed lever, the inwardly extending lever arm cooperating with a positive guide. The positive guide may in this case comprise a guide track which cooperates with a guide pin of the lever arm. In this case, it is particularly advantageous to have a design which entails particularly low frictional losses and in which the guide track runs eccentrically with respect to the axis of rotation of the centrifugal wheel. A further advantage of such a design is that the setting of the amount of eccentricity makes it possible in a simple way to influence the variation in the pivot angle of the ejector levers.

As already mentioned, a particularly preferred field of use of the centrifugal ejector according to the invention is in rotary snow plows, and there is therefore advantageously provision for the centrifugal wheel to be connected to a helical conveyor of a rotary snow plow.

In order, finally, to provide a drive for the centrifugal ejector in a simple way, according to one preferred embodiment there is provision for the centrifugal wheel to be connected to a drive shaft which can be coupled to a power take-off shaft of an agricultural vehicle, in particular a tractor.

DETAILED DESCRIPTION OF THE PREFERRED EMBODIMENT(S)

Figure 2:
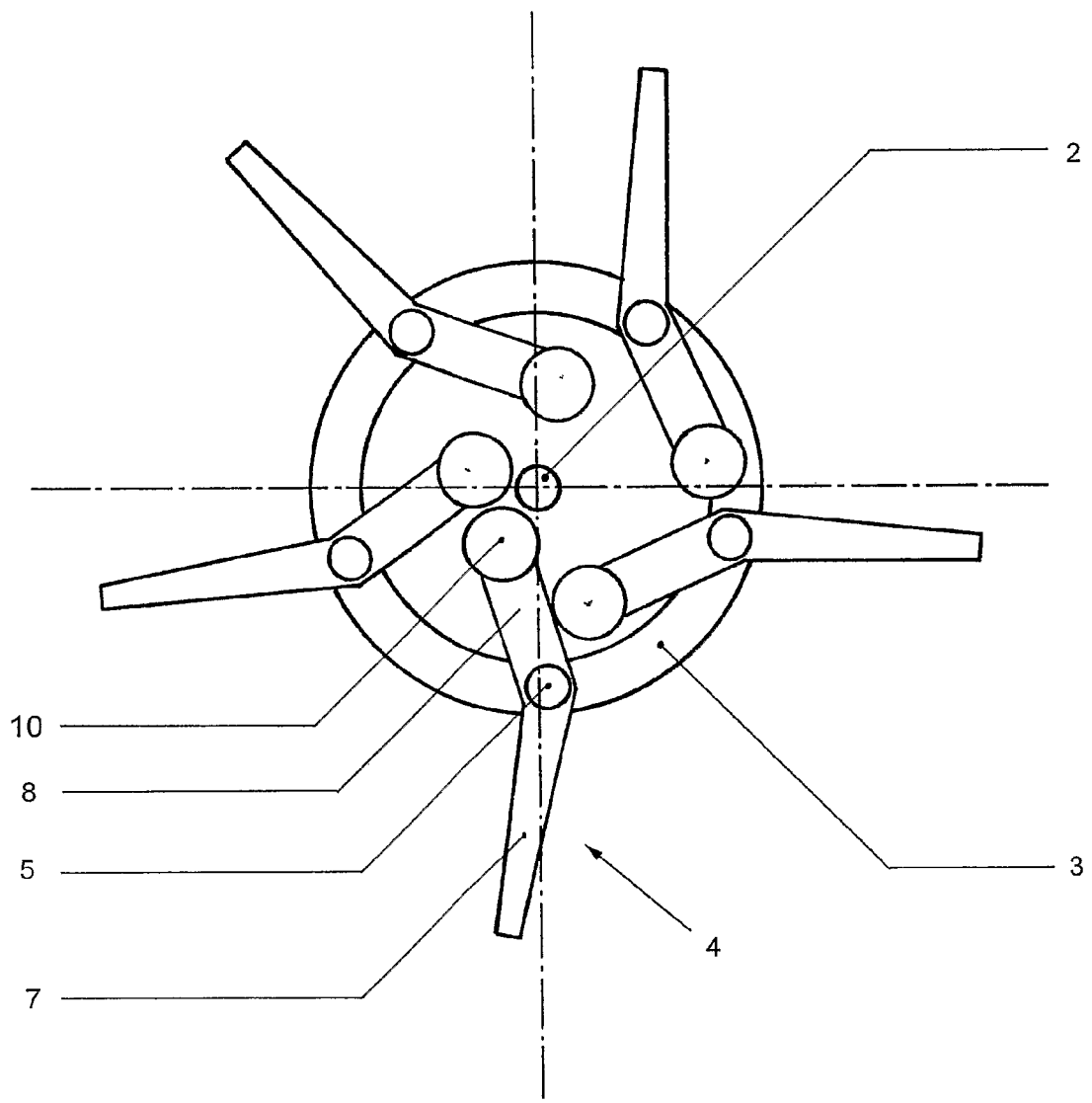
FIG. 2 is an illustration of the Centrifugal Ejector wheel and levers.
Figure 3:
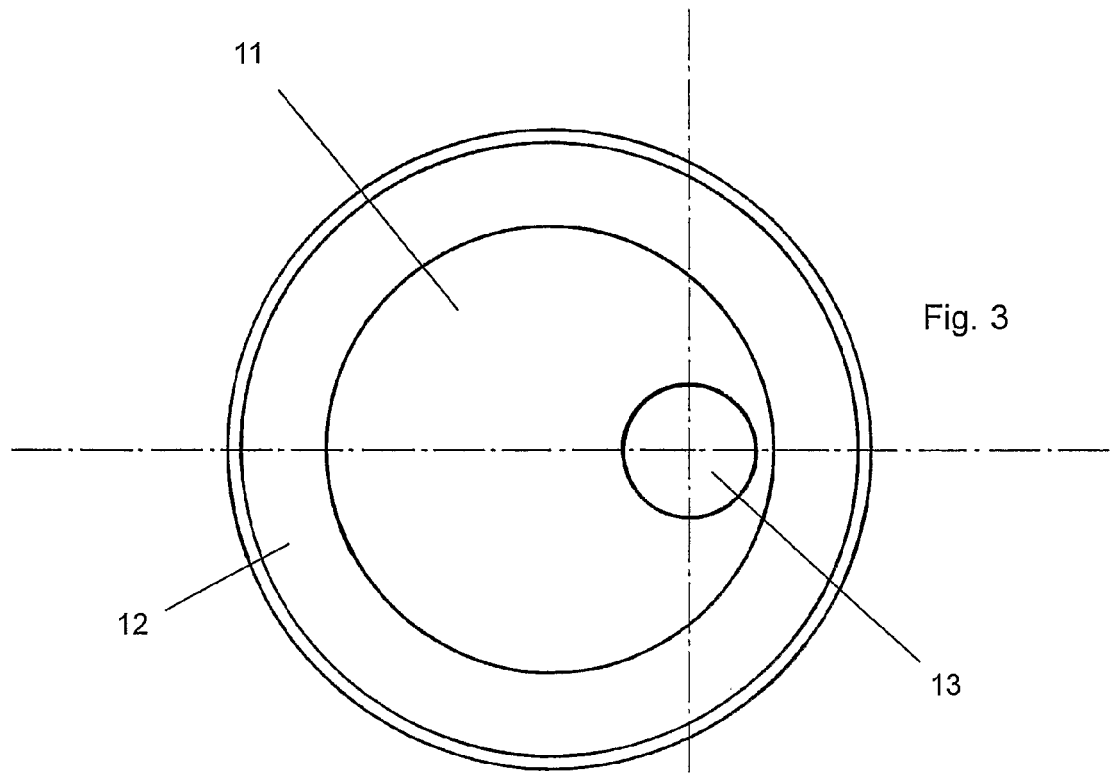
FIG. 3 is an axial view of an ejector wheel illustrating the orientation of a single perforation and guide track.
Figure 4:
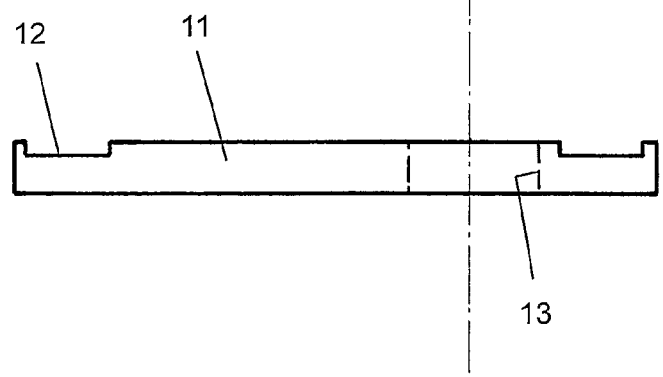
FIG. 4 is a cross-section of the ejector wheel of FIG. 3.

The invention is explained in more detail below with reference to an exemplary embodiment illustrated diagrammatically in the drawing. In this, FIG. 1 shows a cross section through the centrifugal ejector according to the invention, FIG. 2 shows a view of a detail of the centrifugal wheel, and FIG. 3 and FIG. 4 show a view of a detail of the eccentric guide part.

Figure 1:
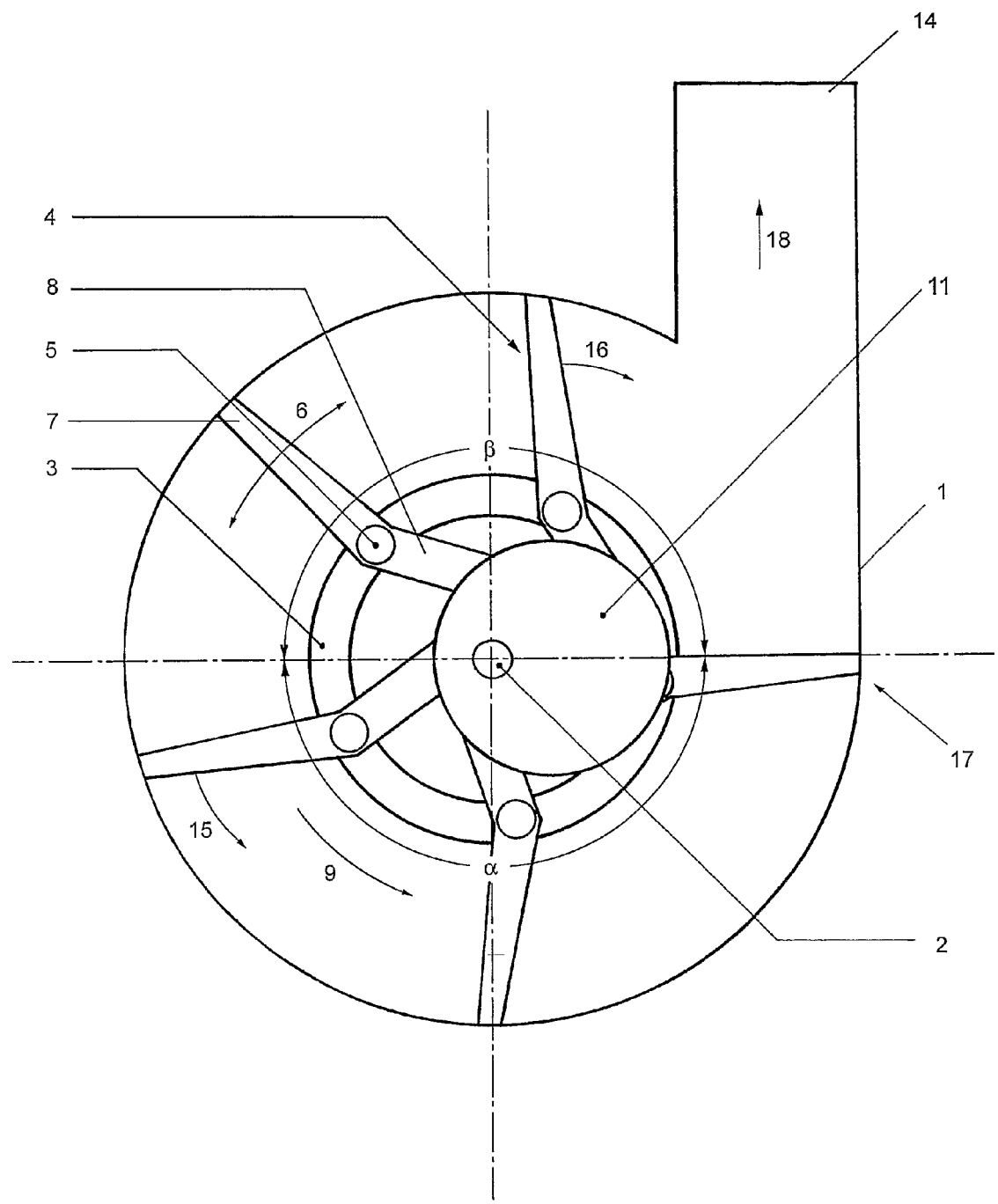
FIG. 1 is a cross-sectional axial plan view of the Centrifugal Ejector.

In FIG. 1, the housing of the centrifugal ejector is designated by 1, in which housing a centrifugal wheel 3 is mounted rotatably about the axis 2 in the direction of the arrow 9. The centrifugal wheel has a plurality of ejector levers 4 which are in each case articulated on the centrifugal wheel 3 pivotably about an axis 5 according to the double arrow 6. The ejector levers 4 are designed as two-armed levers, the outer lever arm 7 performing the actual ejection work, and the inwardly extending lever arm 8 having in each case guide pins or bearings 10, as is evident particularly from FIG. 2. The guide pins 10 are guided in a circular guide track 12 of a guide part 11, the guide track 12 being arranged eccentrically with respect to the axis of rotation 2 of the centrifugal wheel 3. The guide part has a perforation 13 which serves for the passage of a drive shaft for the centrifugal wheel 3. When the centrifugal wheel is set in rotation according to the arrow 9, the following movement of the ejector levers 4 occurs. Over a first range of angle of rotation a, the ejector levers 4 are moved, during the rotation of the centrifugal wheel 3, in the direction of the arrow 9 starting from a neutral position further and further forward in the direction of the arrow 15, so that the circumferential speed of the ejector levers 4 is increased, as compared with a rigid securing to the centrifugal wheel 3. The highest circumferential speed of the ejector levers 4 occurs at the point, designated by 17, at which the ejection of the feed material takes place via the ejection orifice 14 in the direction of the arrow 18. Over the further range of angle of rotation β, a backward pivoting of the ejector levers 4 in the direction of the arrow 16 then takes place, so that, in this range, the circumferential speed of the ejector levers 4 is reduced, as compared with a rigid securing of the ejector levers 4 to the centrifugal wheel 3.

The invention claimed is:

1. A centrifugal ejector with a centrifugal wheel which has at least one ejector lever and which is mounted in a housing having an ejection orifice and can be driven in rotation, wherein the at least one ejector lever is secured pivotably to the centrifugal wheel and means for the defined variation of the pivot angle of the ejector lever as a function of the angle of rotation of the centrifugal wheel are provided, the means being designed to bring about, over a first range of angle of rotation, a pivoting of the ejector lever in the direction of rotation and, over a further range of angle of rotation, a pivoting of the ejector lever opposite to the direction of rotation of the centrifugal wheel, and the ejection orifice being connected tangentially to the centrifugal wheel within, preferably toward or at the end of, the first range of angle of rotation.

2. The centrifugal ejector as claimed in claim 1, wherein the at least one ejector lever is designed as a two-armed lever, the inwardly extending lever arm cooperating with a positive guide.

3. The centrifugal ejector as claimed in claim 2, wherein the positive guide comprises a guide track which cooperates with a guide pin of the lever arm.

4. The centrifugal ejector as claimed in claim 3, wherein the guide track runs eccentrically with respect to the axis of rotation of the centrifugal wheel.

5. The centrifugal ejector as claimed in claim 1, wherein the ejector lever is arranged so that the outwardly extending lever arm forms an angle of essentially 90° with the axis of the ejection orifice in a radial position with respect to the centrifugal wheel.

6. The centrifugal ejector as claimed in claim 1, wherein the centrifugal wheel is connected to a helical conveyor of a rotary snow plow.

7. The centrifugal ejector as claimed in claim 1, wherein the centrifugal wheel is connected to a drive shaft which can be coupled to a power take-off shaft of an agricultural vehicle, in particular a tractor.

8. A rotary snow plow having a centrifugal ejector as claimed in claim 1.

\* \* \* \* \*